US012637941B2

(12) United States Patent
Quero et al.

(10) Patent No.: US 12,637,941 B2
(45) Date of Patent: May 26, 2026

(54) AUTOMATED MONITORING AND DIAGNOSTICS FOR HYDROCARBON WELL OPERATIONS

(71) Applicant: Halliburton Energy Services, Inc., Houston, TX (US)

(72) Inventors: Philippe Quero, Houston, TX (US); Jeremy C. Nicholson, Houston, TX (US); Graham Jack, Newburgh (GB); David Bennett, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 283 days.

(21) Appl. No.: 18/475,980

(22) Filed: Sep. 27, 2023

(65) Prior Publication Data

US 2025/0101863 A1 Mar. 27, 2025

(51) Int. Cl.
*E21B 47/10* (2012.01)
*E21B 47/06* (2012.01)
(Continued)

(52) U.S. Cl.
CPC .............. *E21B 47/10* (2013.01); *E21B 47/06* (2013.01); *E21B 47/18* (2013.01); *F17D 5/06* (2013.01)

(58) Field of Classification Search
CPC .......... E21B 47/10; E21B 47/06; E21B 47/18; E21B 47/107; F17D 5/06
See application file for complete search history.

(56) References Cited

U.S. PATENT DOCUMENTS 6,401,814 B1 6/2002 Owens et al.
6,993,963 B1 2/2006 Gudmundsson
(Continued)

FOREIGN PATENT DOCUMENTS

CN 104121014 A 10/2014
CN 114961704 A 8/2022
(Continued)

OTHER PUBLICATIONS

Adnan et al., "Leak detection in gas pipeline by acoustic and signal processing—A review", IOP Conf. Ser.: Mater. Sci. Eng. 100 012013, 2015, 10 pages.
(Continued)

*Primary Examiner* — Laura Martin
*Assistant Examiner* — Anthony W Megna Fuentes
(74) *Attorney, Agent, or Firm* — Kilpatrick Townsend & Stockton, LLP

(57) ABSTRACT

A system for automatically monitoring and performing diagnostic procedures on a conduit of a hydrocarbon well operation is disclosed. System examples can use a combination of sensors, data acquisition devices, and computing devices to provide fully automated conduit monitoring and diagnostic procedures that can be based on a variety of different triggering conditions. At least one sensor can be located in fluid communication with the interior of a conduit. A pressure wave traveling through the conduit as a result of deliberate action or a natural occurrence is reflected by abnormal conditions in the conduit. The sensor can receive signals comprising the pressure wave reflections. Pressure data generated by the sensor in response to receiving the signals may be automatically collected and subsequently provided to a computing device that can analyze the pressure data and determine the existence and nature of one or more abnormal conditions of the conduit.

20 Claims, 5 Drawing Sheets

(51) Int. Cl.

| | |
|---|---|
| *E21B 47/107* | (2012.01) |
| *E21B 47/18* | (2012.01) |
| *F17D 5/06* | (2006.01) |

(56) References Cited

U.S. PATENT DOCUMENTS

| | | | | |
|---|---|---|---|---|
| 10,815,778 | B1 | 10/2020 | Hou et al. | |
| 11,560,792 | B2 | 1/2023 | Zhang et al. | |
| 2009/0165548 | A1 | 7/2009 | Pop et al. | |
| 2014/0036627 | A1 | 2/2014 | Hull et al. | |
| 2014/0352891 | A1 | 12/2014 | Yoshikawa | |
| 2014/0352981 | A1 | 12/2014 | Fripp et al. | |
| 2015/0275639 | A1 | 10/2015 | Wang et al. | |
| 2016/0168978 | A1 | 6/2016 | Kozak et al. | |
| 2017/0089179 | A1 | 3/2017 | Barfoed et al. | |
| 2018/0058189 | A1 | 3/2018 | Quintero | |
| 2018/0298738 | A1 | 10/2018 | Mujica et al. | |
| 2019/0169982 | A1 | 6/2019 | Hauge et al. | |
| 2020/0133251 | A1 | 4/2020 | Rossi | |
| 2021/0032979 | A1 | 2/2021 | Granville et al. | |
| 2021/0032984 | A1 | 2/2021 | Kabannik | |
| 2021/0254451 | A1 | 8/2021 | Haldar et al. | |
| 2021/0293130 | A1 | 9/2021 | Revheim et al. | |
| 2021/0397994 | A1 | 12/2021 | Cerrahoglu et al. | |
| 2022/0243568 | A1 | 8/2022 | Altammar et al. | |
| 2022/0317091 | A1 | 10/2022 | Bennett et al. | |
| 2022/0333477 | A1 | 10/2022 | Kalyanraman et al. | |
| 2022/0404180 | A1 * | 12/2022 | Newman | F16L 55/48 |
| 2023/0108047 | A1 | 4/2023 | Davis et al. | |
| 2023/0147476 | A1 * | 5/2023 | Wheelock | G01V 1/46<br>367/82 |
| 2024/0052714 | A1 * | 2/2024 | Bennett | E21B 47/107 |

FOREIGN PATENT DOCUMENTS

| | | | |
|---|---|---|---|
| EP | 3500725 | B1 | 4/2021 |
| WO | 2019032606 | A1 | 2/2019 |
| WO | 2019135737 | A1 | 7/2019 |
| WO | 2019156661 | A1 | 8/2019 |
| WO | 2019156742 | A1 | 8/2019 |
| WO | 2019199344 | A1 | 10/2019 |
| WO | 2019245583 | A1 | 12/2019 |
| WO | 2020040800 | A1 | 2/2020 |
| WO | 2020117321 | A1 | 6/2020 |
| WO | 2020162964 | A1 | 8/2020 |
| WO | 2021020985 | A1 | 2/2021 |
| WO | 2021148141 | A1 | 7/2021 |
| WO | 2022025790 | A1 | 2/2022 |

OTHER PUBLICATIONS

Alves et al., "A Unified Model for Predicting Flowing Temperature Distribution in Wellbores and Pipelines", SPE Prod Eng 7, 1992, pp. 363-367.

Dung et al., "Practical Applications of Water Hammer Analysis from Hydraulic Fracturing Treatments", Society of Petroleum Engineers, paper presented at the SPE Hydraulic Fracturing Technology Conference and Exhibition, Virtual, May 2021, 47 pages.

Halliburton Energy Services, Inc., "InnerVue Diagnostics", Product Sheet, Jun. 2022, 1 page.

Halliburton Energy Services, Inc., "InnerVue WellSuite Diagnostics Service", Product Sheet, Nov. 2020, 3 pages.

Halliburton Energy Services, Inc., "InnerVue™ Pipeline Blockage Detection: A Non-Intrusive Solution to Locate Blockages and Stuck Pigs", Product Sheet, Jul. 2022, 1 page.

Halliburton Energy Services, Inc., "InnerVue™ Pipeline Deposit Profiling: A Non-Intrusive Solution to Assess Pipeline Deposits", Product Sheet, Jul. 2022, 1 page.

Halliburton Energy Services, Inc., "InnerVue™ Pipeline Leak Detection, Non-Intrusive Location and Quantification of Leaks", Product Sheet, Jul. 2022, 1 page.

Halliburton Energy Services, Inc., "InnerVue™ Pipeline Pig Tracking: Pig Tracking Through Pressure Wave Analysis", Product Sheet, Jul. 2022, 1 page.

Idachaba, "Multiple Surface Pipeline Leak Detection Using Real-Time Sensor Data Analysis", Theses and Dissertations. 4536, https://commons.und.edu/theses/4536, Dec. 2022, 128 pages.

Pourafshary et al., "A compositional wellbore/reservoir simulator to model multiphase flow and temperature distribution", Journal of Petroleum Science and Engineering, vol. 69, Issues 1-2, 2009, pp. 40-52.

Yang et al., "Prediction of wellbore and formation temperatures during circulation and shut-in stages under kick conditions", Energy, vol. 91, 2015, pp. 1018-1029.

International Patent Application No. PCT/US2023/075253, "International Search Report and Written Opinion", mailed Jun. 17, 2024, 11 pages.

International Patent Application No. PCT/US2023/075284, "International Search Report and Written Opinion", mailed Jun. 24, 2024, 11 pages.

International Patent Application No. PCT/US2023/075286, "International Search Report and Written Opinion", mailed Jun. 21, 2024, 9 pages.

International Patent Application No. PCT/US2023/075287, "International Search Report and Written Opinion", mailed Jun. 18, 2024, 10 pages.

* cited by examiner

AUTOMATED MONITORING AND DIAGNOSTICS FOR HYDROCARBON WELL OPERATIONS

TECHNICAL FIELD

The present disclosure relates generally to hydrocarbon well operations, and more particularly although not necessarily exclusively, to automated monitoring and diagnostics for hydrocarbon well operations.

BACKGROUND

Understanding the condition of different hydrocarbon well production stages or components, such as the condition of a well operation conduit, can allow a hydrocarbon well operator to better control and maximize production operations. Likewise, the ability to automatically detect and diagnose abnormal hydrocarbon well production component conditions in real time is useful to avoiding production reductions or shutdowns, and diagnostic data can be used with predictive or other modeling techniques to schedule appropriate maintenance or to provide information and guidance to more immediate remediation activities.

DETAILED DESCRIPTION

Figure 1:
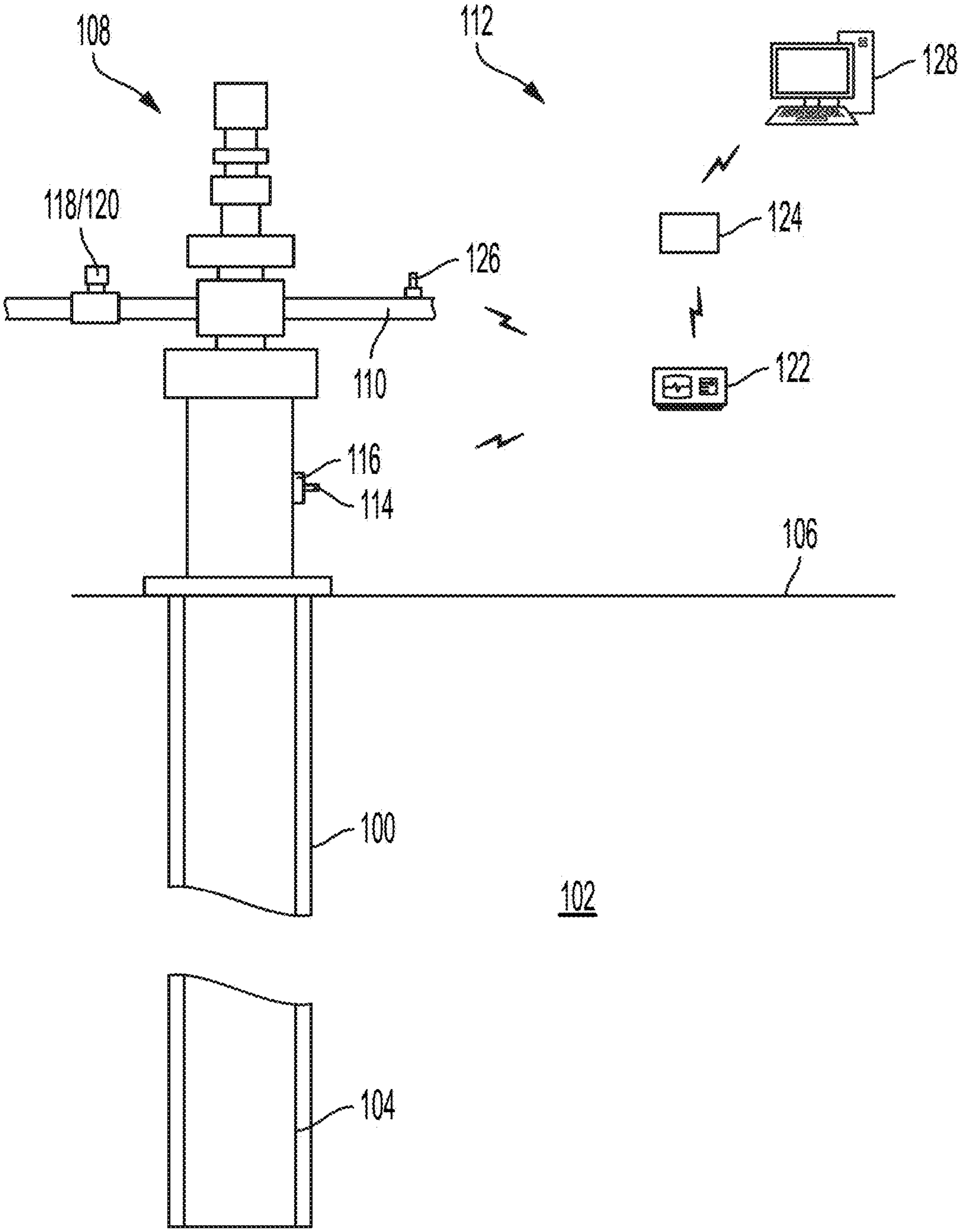
FIG. 1 is a schematic diagram of system installed to monitor and perform diagnostic procedures relative to a wellbore of a hydrocarbon well operation, according to one example of the present disclosure.

Certain aspects and examples of the present disclosure relate to a system for monitoring and performing diagnostic procedures on various types of hydrocarbon well operation conduits. System examples may be installed to and used to automatically monitor and perform diagnostic procedures on, for example and without limitation, hydrocarbon well operation conduits in the form of wellbore casings, flowlines, and pipelines. System examples may use a combination of sensors, data acquisition devices, and computing devices to provide conduit monitoring and diagnostic procedures that are fully automated and can be initiated by a variety of different triggering conditions.

System examples can include a sensor that is installed to a conduit of interest, such as into an existing port of the conduit. Alternatively, a sensor can be installed to a location that is in fluid communication with the conduit, such that the sensor can still be used to monitor and perform diagnostic procedures relative to the conduit. In either case, the sensor is exposed to a fluid flowing through the conduit. The sensor is of a type that can receive signals generated by pressure waves traveling through the conduit. For example, the sensor can be an acoustic sensor. It is also possible for a given system to employ more than one sensor that can receive signals generated by pressure waves traveling through the conduit.

A pressure wave may be deliberately transmitted to the fluid flowing in the conduit, such as by a pulse generator. A pulse generator may be an existing valve that can briefly stop the flow of fluid in the conduit when closed, which will result in the generation of a pressure pulse (wave) that travels through the fluid and the conduit. In other examples, another type of pulse generator, such as an acoustic signal emitter, may be employed to deliberately transmit a pressure wave to the fluid flowing in the conduit. Alternatively, a pressure wave may be naturally generated in the conduit as a result of a leak of fluid from the conduit, such as through a hole or crack in the conduit.

When a pulse generator is used to transmit a pressure wave to the fluid flowing in the conduit, the pulse generator may be located near the sensor. This allows the sensor to receive signals comprising reflections of the pressure wave as the pressure wave travels through the conduit. The reflections may be caused by abnormal conditions of the conduit, such as but not limited to, depositions or blockages inside the conduit, and leaks in the conduit. The timing and other characteristics of the reflections can be analyzed to determine the nature and severity of a given abnormal condition.

System examples can include a data acquisition device such as a data logger or a similar device or instrument that can record, store or otherwise collect data generated by the sensor relative to the signals received by the sensor. The data acquisition device may also present collected data in a graphical form that is useful in understanding one or more of the nature, severity, or location of an abnormal condition of a given conduit.

According to examples, operation of a system may be governed by a controller that is communicatively coupled to at least the data acquisition device, and possibly also to the sensor and to a pulse generator. In this regard, the controller can include a processor and memory that is communicatively coupled to the processor. The memory can include instructions that are executable by the processor to cause the processor to perform, or cause to be performed, various system operations.

It is desirable that operation of the system be automated and proactively detect an abnormal condition inside a conduit prior to the abnormal condition detrimentally affecting an associated hydrocarbon well operation. As such, the controller may initiate operation of the system to monitor and perform diagnostic procedures on a conduit upon the detection of certain triggering conditions inside the conduit. One example of such a triggering condition may be, for example, an unexpected or excessive change in pressure of a fluid flowing in the conduit, such as may be determined by another (e.g., second sensor). Another example of such a triggering condition may be a change in one or more characteristics of the fluid flowing in the conduit, such as may be determined by other devices or processes and communicated to the system. It is also possible for the controller to initiate operation of the system to monitor and perform diagnostic procedures on a conduit based on a scheduled operation or upon expiration of a timer. Likewise, system operation can be triggered by a manual command to the controller from an external device or system, including a command issued by a user of the system.

Initiation of system operation by the controller at least starts the data collection process by the data acquisition device. Initiation of system operation by the controller can also cause an automated valve or another type of pulse generator to transmit a pressure wave to the fluid flowing in the conduit, which may occur before or after the initiation of the data collection process by the data acquisition device. Initiation of system operation by the controller can also turn on or otherwise provide power to the sensor in examples where the at least one sensor requires electrical energy to operate.

Data generated by the sensor and collected by the data acquisition device during system operation can be automatically transmitted to a computing device for analysis. For example, the controller can receive the data from the data acquisition device and transmit the data to the computing device in some examples. In other examples, the data acquisition device may transmit the collected data directly to the computing device, either at the instruction of the controller, the computing device, or otherwise. In still other examples, the controller or the data acquisition device may transmit the data to a temporary storage location, such as a cloud storage location, for subsequent retrieval by the computing device. In any case, the computing device can reside locally to or remotely from the other components of the system, and may be in wired or wireless communication therewith. For example, the controller or another component of the system may communicate with the computing device over a network.

The computing device can be programmed to determine one or more abnormal conditions of the conduit based on the data generated by the sensor and analyzed by the computing device. The computing device may also be programmed to report the one or more abnormal conditions of the conduit, such as to personnel responsible for operating or maintaining the affected conduit of the hydrocarbon well operation. Consequently, when an abnormal condition of a conduit is determined and reported by the computing device, maintenance scheduling, a remediation operation, or other appropriate actions may be undertaken relative to the abnormal condition.

Data obtained by a system according to some examples can be useful in various applications. For example, the data can be used in predictive modeling applications relative to future hydrocarbon well operations, such as but not limited to wellbore, flowline, or pipeline design, maintenance scheduling, etc. Predictive modeling using data obtained by a system example can employ traditional modeling techniques or machine learning techniques. Data obtained by a system according to some examples can also be used to identify and possibly quantify product (i.e., fluid) loss due to a leak in a conduit or due to theft. Further, because system examples are permanently installed relative to a given conduit or conduits, accurate trends or other insights about the conduit can be learned over time.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic diagram of one example of a wellbore 100 of a hydrocarbon well operation. The wellbore 100 can be formed in a subterranean formation 102 or, alternatively or additionally, in a sub-oceanic formation. The wellbore 100 can be a first wellbore in a set of wellbores of a multi-well pad or other suitable structure or system. The wellbore 100 can include a casing 104 or other suitable component (e.g., a tubing string, etc.) through which produced fluid from the wellbore 100 can be transported to the surface 106. The outflow of fluid from the wellbore 100 can be controlled by various components of a wellhead 108. The fluid from the wellbore 100 can be transferred to a downstream location, such as for example, to a downstream station or treatment facility, via a flowline 110.

One example of a hydrocarbon well conduit monitoring and diagnostic system (hereinafter also "system") 112 for monitoring and performing diagnostic procedures on a conduit of a hydrocarbon well operation is also depicted in FIG. 1. The system 112, and systems according to other examples, are permanent systems in the sense that the sensors, data acquisition devices, controllers, and possibly other components thereof, remain connected to the conduit after installation and continue to monitor and perform diagnostic procedures relative to the conduit. For example, a first sensor of a system can be permanently installed to a location that is in fluid communication with the conduit and where the first sensor can receive signals comprising reflections of a pressure wave traveling through fluid in the conduit. In this regard, the first sensor can be installed to an existing port or another existing fluid access point in the conduit.

In the system 112, the conduit of interest is the casing 104 of the wellbore 100. As depicted in FIG. 1, a first sensor 114 is installed to a portion of the wellhead 108 extending from the casing 104, but other installation locations are also possible. The first sensor 114 can be an acoustic sensor, or another type of sensor that is capable of receiving and understanding signals comprising pressure wave reflections. The first sensor 114 can be permanently installed in an already existing port 116 of the wellhead 108, or via another access point that is in fluid communication with the wellbore casing 104, as described above.

A pressure wave may be deliberately transmitted to the fluid in the wellbore casing 104 to produce a pressure signal that can be detected by the first sensor 114. The pressure wave can be generated in various ways. For example, a valve 118 in fluid communication with the fluid in the wellbore casing 104, may be temporarily closed to produce a pressure wave that travels through the fluid in the wellbore casing 104. Alternatively, a pulse generator 120, such as an acoustic wave generator, may be used to transmit a pressure wave to the fluid in the wellbore casing 104. Specific timing may be utilized to generate a pressure wave having sufficient energy to traverse a desired conduit length without also, for example, interfering with returning reflections of the pressure wave. In one example, generation of a pressure wave (signal) occurs within a timing window of 0.5 seconds to 2 seconds.

As the generated pressure wave travels through the fluid in the wellbore casing 104, the first sensor 114 receives signals comprising reflections of the pressure wave from surfaces or objects in the wellbore casing 104. For example, reflections of the pressure wave may result from an abnormal condition inside the wellbore casing 104 such as but not limited to a deposition, a blockage, or a deformation of the conduit. A reflection of the traveling pressure wave may also be caused by a leak in the wellbore casing 104. As previously mentioned, the timing and other characteristics of the reflection signals received by the first sensor 114 can be analyzed to determine the nature and severity of a given abnormal condition.

The system 112 according to the example of FIG. 1, further includes a data acquisition device 122, such as a data logger or a similar device or instrument that can record, store or otherwise collect data generated by the first sensor 114 in response to the receipt of signals comprising reflections of the pressure wave traveling through the wellbore casing 104. The data acquisition device 122 may include a processor and memory that is communicatively coupled to the processor. The memory can further include instructions that are executable by the processor to cause the data acquisition device 122 to perform at least data collection operations. The data acquisition device 122 may be hardwired to a power source or may be battery powered. The data acquisition device 122 may be configured to communicate with components of the system 112 via a local interface. Alternatively, the data acquisition device 122 may include a transceiver or other componentry that provides the data acquisition device 122 with wireless communication capabilities. Wireless communications between the data acquisition device 122 and other components of the system 112 are indicated in FIG. 1 for purposes of illustration.

The system 112 of FIG. 1 may include a controller 124 that is communicatively coupled to, or is a part of, the data acquisition device 122, and governs operation of the system 112. When the controller 124 is a separate component of the system 112, as is represented in FIG. 1 for purposes of illustration, the controller 124 can include a processor, and memory that is communicatively coupled to the processor and includes instructions that are executable by the processor to cause the processor to perform any of the controller functions described herein. In an example where the controller 124 is instead a part of (i.e., a controller of) the data acquisition device 122, the controller can govern the operations of the data acquisition device as well as the operations of other components of the system 112.

The controller 124 can cause the system 112 to monitor and perform diagnostic procedures on the wellbore casing 104 in an automated manner. That is, monitoring and diagnostic procedures may be performed relative to the wellbore casing 104 without the need for operator initiation, input or involvement. For example, in addition to being communicatively coupled to, or a part of, the data acquisition device 122, the controller 124 may also be communicatively coupled (through wireless communications in this example) to the first sensor 114, to the valve 118, or to the pulse generator 120 when present. The valve 118 may be a motor actuated valve or another type of powered valve than may operate in accordance with signals from the controller 124. The pulse generator 120 may also be configured to operate in accordance with signals from the controller 124. In some examples, the first sensor 114 may be a powered sensor, and power to the first sensor 114 may be controlled by the controller 124. In this manner, the controller 124 can automatically initiate and govern operation of the system 112.

The controller 124 can initiate operation of the system 112 to perform monitoring and diagnostic procedures relative to the wellbore casing 104 based on various criteria. For example, and without limitation, the controller can initiate operation of the system 112 upon the detection of certain triggering conditions inside the wellbore casing 104. In one non-limiting example, the controller 124 may initiate system operation when there is a change in the pressure of the fluid in the wellbore casing 104. For example, a detected pressure of the fluid may change suddenly or may increase or decrease beyond a certain preset threshold. A second sensor 126 may be placed in fluid communication within the fluid to detect such a change in pressure, and can send a signal to the controller 124 when such a change in pressure is detected. In another non-limiting example, the controller 124 may initiate system operation when there is change in one or more characteristics of the fluid. Such characteristics can include for example, fluid acoustic velocity, fluid pumping profiles, or fluid temperature, density, viscosity, phase, etc. Triggering thresholds may be set and stored relative to fluid characteristics in the same manner as for pressure changes.

In still other examples, the controller 124 can initiate operation of the system 112 to perform monitoring and diagnostic procedures based on a programmed schedule (e.g., daily or weekly), upon expiration of a timer (e.g., after a certain amount of time has elapsed after a detected triggering condition or a previous operation). Other system operation initiation triggers can also be employed. It may also be possible for operation of the system 112 to be triggered by a manual command to the controller 124, such as may be sent by an operator or from an external device or system.

Data is generated by the first sensor 114 in response to receiving signals comprising reflections of the pressure wave traveling through the wellbore casing 104. The data generated by the first sensor 114 can be collected by the data acquisition device 122 and can be stored in an internal memory or at an external data store communicatively coupled to the data acquisition device 122. At least for purposes of supporting data accuracy, the data collection device 122 can operate at a high sampling rate when collecting (acquiring) pressure data generated by the first sensor 114. For example, the data collection device 122 preferably acquires pressure data at a sampling rate (sampling frequency) that is greater than 4 KHz.

The controller 124 can automatically transmit the data generated by the first sensor 114 and collected by the data acquisition device 122 to a computing device 128 for analysis. In some examples, the controller 124 can receive the data from the data acquisition device 122 and transmit the data to the computing device 128. In other examples, such as where the controller is a part of the data acquisition device 122, the data acquisition device 122 can transmit the collected data directly to the computing device 128. The data may be transmitted to the computing device 128 at the instruction of the controller 124, at the request of the computing device 128, or otherwise. The computing device 128 can reside locally to the other components of the system 112 and may be communicatively coupled to at least the controller 124 of the system via a local interface. Alternatively, the computing device 128 can reside remotely from the other components of the system 112, and may receive the data generated by the first sensor 114 and collected by the data acquisition device 122 over a network, such as but not limited to the Internet.

The computing device 128 can include various software or applications, or may be otherwise programmed, to analyze the data generated by the first sensor 114 in response to receiving signals comprising reflections of the pressure wave traveling through the wellbore casing 104. To enhance the ability of the computing device 128 to detect pressure wave reflections generated by abnormal wellbore conditions in particular, the analysis performed by the computing device 110 may be focused on pressure signals occurring within a specific frequency range. In one example, the specific frequency range may be 0 Hz to 70 Hz.

Based on analysis of the data, the computing device 128 is able to determine one or more abnormal conditions of the wellbore casing 104. The computing device 128 may also determine the severity or the location of a given abnormal condition. Once the computing device 128 determines there are one or more abnormal conditions of the wellbore casing 104, the computing device 128 can also report the one or more abnormal conditions by, for example, sending one or more types of communications to relevant personnel, such as personnel responsible for operating or maintaining the wellbore casing 104. A notification can also be generated on a display of the computing device 128, a display coupled to the controller 124 of data acquisition device 122, etc. Appropriate actions may then be undertaken relative to the abnormal condition(s) of the wellbore casing 104.

Figure 2:
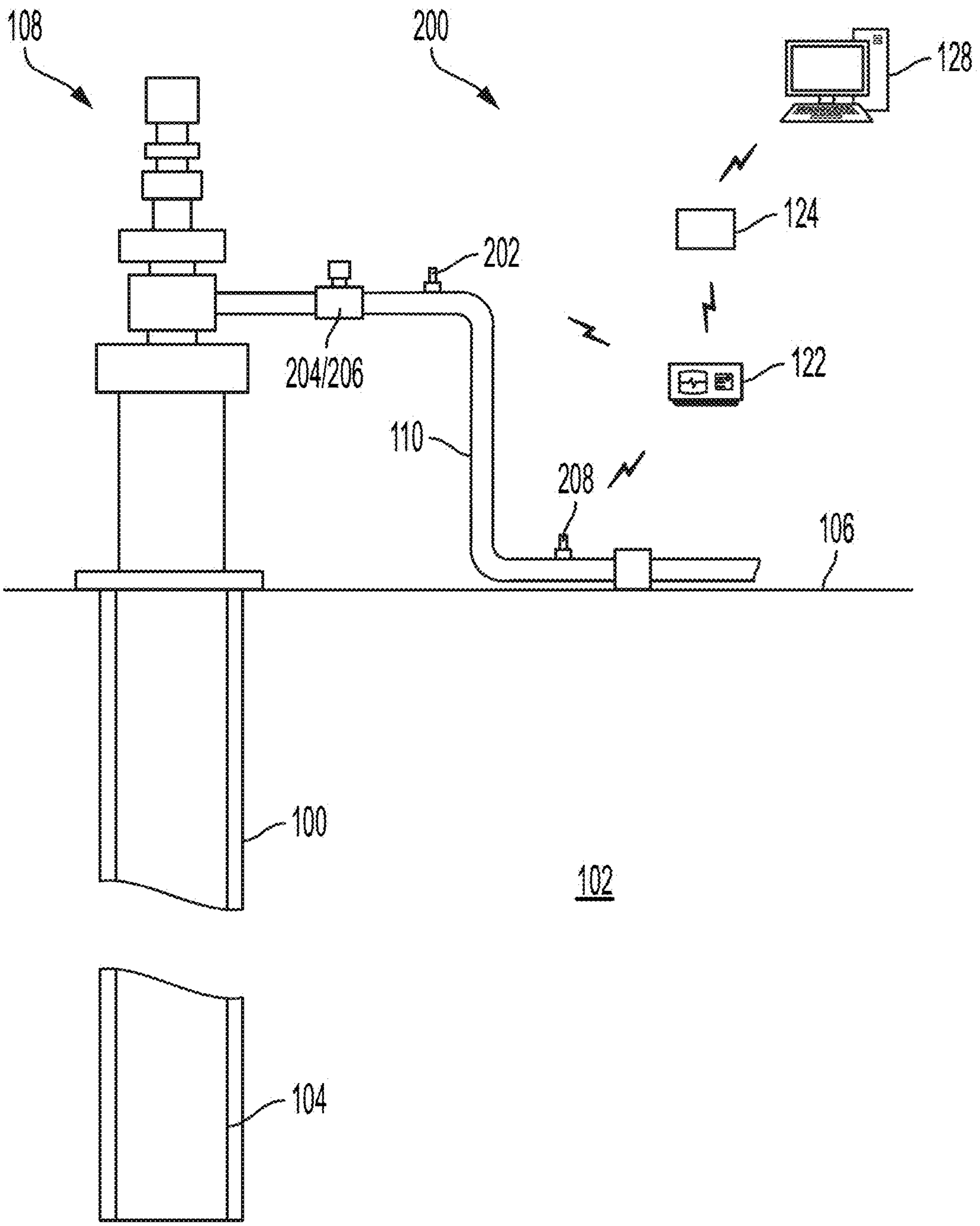
FIG. 2 is a schematic diagram of a system installed to monitor and perform diagnostic procedures relative to a flowline of a hydrocarbon well operation, according to one example of the present disclosure.

Another example of a system 200 for monitoring and performing diagnostic procedures on a conduit of a hydrocarbon well operation is depicted in FIG. 2. In this example, the conduit is the flowline 110 connected to the wellhead 108 associated with the wellbore 100 of FIG. 1, instead of the wellbore casing 104.

In the example of FIG. 2, the system 200 again includes the data acquisition device 122, controller 124, and computing device 128 of the system 112 described above with respect to FIG. 1. The data acquisition device 122, controller 124, and computing device 128 can be configured, and can communicate and operate, in any previously described manner. In the system 200, a first sensor 202 is installed to the flowline 110 to receive signals comprising reflections of a pressure wave traveling through the flowline 110. The first sensor 202 may again be any type of sensor that is capable of receiving and understanding signals comprising pressure wave reflections, such as, but not limited to, an acoustic sensor. The first sensor 202 can be installed to the flowline 110 in any manner previously described relative to the first sensor 114 of the system 112 of FIG. 1. A second sensor 208 may also be placed in fluid communication with the fluid flowing through the flowline 110 to detect a change in pressure or another fluid characteristic that can be used as a triggering condition for initiating operation of the system 200, as described above.

A pressure wave may be deliberately transmitted to the fluid in the flowline 110 as described above. For example, a valve 204 in fluid communication with the fluid flowing in the flowline 110, may be temporarily closed to produce a pressure wave that travels through the fluid in the flowline 110. In other examples, the valve 204 may be replaced with another type of pulse generator 206 that is responsive to commands from the controller 124.

The data acquisition device 122 collects data generated by the first sensor 202 in response to the receipt of signals comprising reflections of the pressure wave traveling through the flowline 110. Once the data is collected by the data acquisition device 122, the data may be transmitted to the computing device 128 and analyzed as previously described. Determined abnormal conditions of the flowline 110 may be reported.

Figure 3:
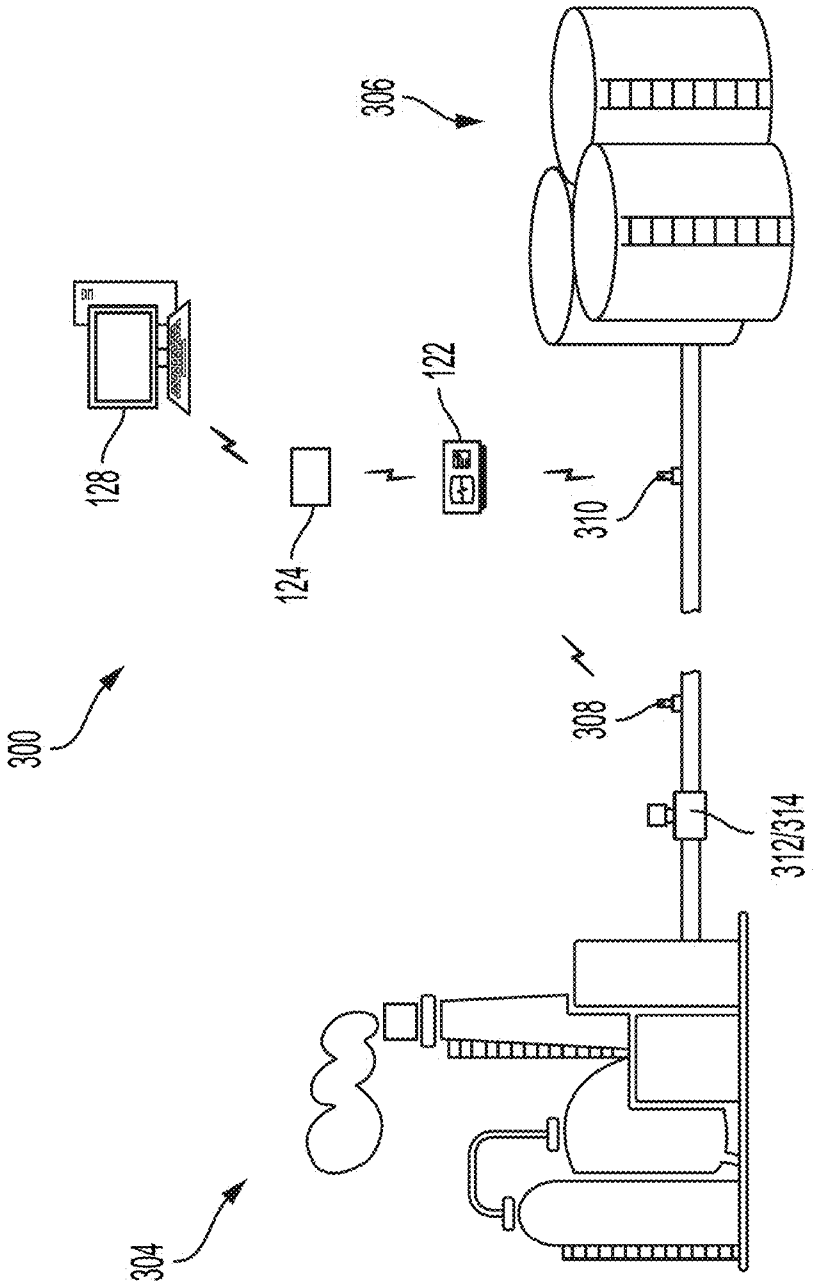
FIG. 3 is a schematic diagram of a system installed to monitor and perform diagnostic procedures relative to a pipeline of a hydrocarbon well operation, according to one example of the present disclosure.

Another example of a system 300 for monitoring and performing diagnostic procedures on a conduit of a hydrocarbon well operation is depicted in FIG. 3. In this example, the conduit is a pipeline 302, such as a downstream pipeline that may carry well fluid from a processing facility 304 to a storage facility 306, or from another downstream location to a further downstream location.

In the example of FIG. 3, the system 300 again includes the data acquisition device 122, controller 124, and computing device 128 of the system 112 described above with respect to FIG. 1. The data acquisition device 122, controller 124, and computing device 128 can be configured, and can communicate and operate, in any previously described manner. In the system 300, a first sensor 308 is installed to the pipeline 302 to receive signals comprising reflections of a pressure wave traveling through the pipeline 302. The first sensor 308 may again be any type of sensor that is capable of receiving and understanding signals comprising pressure wave reflections, such as, but not limited to, an acoustic sensor. The first sensor 308 can be installed to the pipeline 302 in any manner previously described relative to the first sensor 114 of the system 112 of FIG. 1. A second sensor 310 may also be placed in fluid communication with the fluid flowing through the pipeline 302 to detect a change in pressure or another fluid characteristic that can be used as a triggering condition for initiating operation of the system 300, as described above.

A pressure wave may be deliberately transmitted to the fluid in the pipeline 302 as described above. For example, a valve 312 in fluid communication with the fluid flowing in the pipeline 302, may be temporarily closed to produce a pressure wave that travels through the fluid in the pipeline 302. In other examples, the valve 312 may be replaced with another type of pulse generator 314 that is responsive to commands from the controller 124.

The data acquisition device 122 collects data generated by the first sensor 308 in response to the receipt of signals comprising reflections of the pressure wave traveling through the pipeline 302. Once the data is collected by the data acquisition device 122, the data may be transmitted to the computing device 128 and analyzed as previously described. Determined abnormal conditions of the pipeline 302 may be reported.

Figure 4:
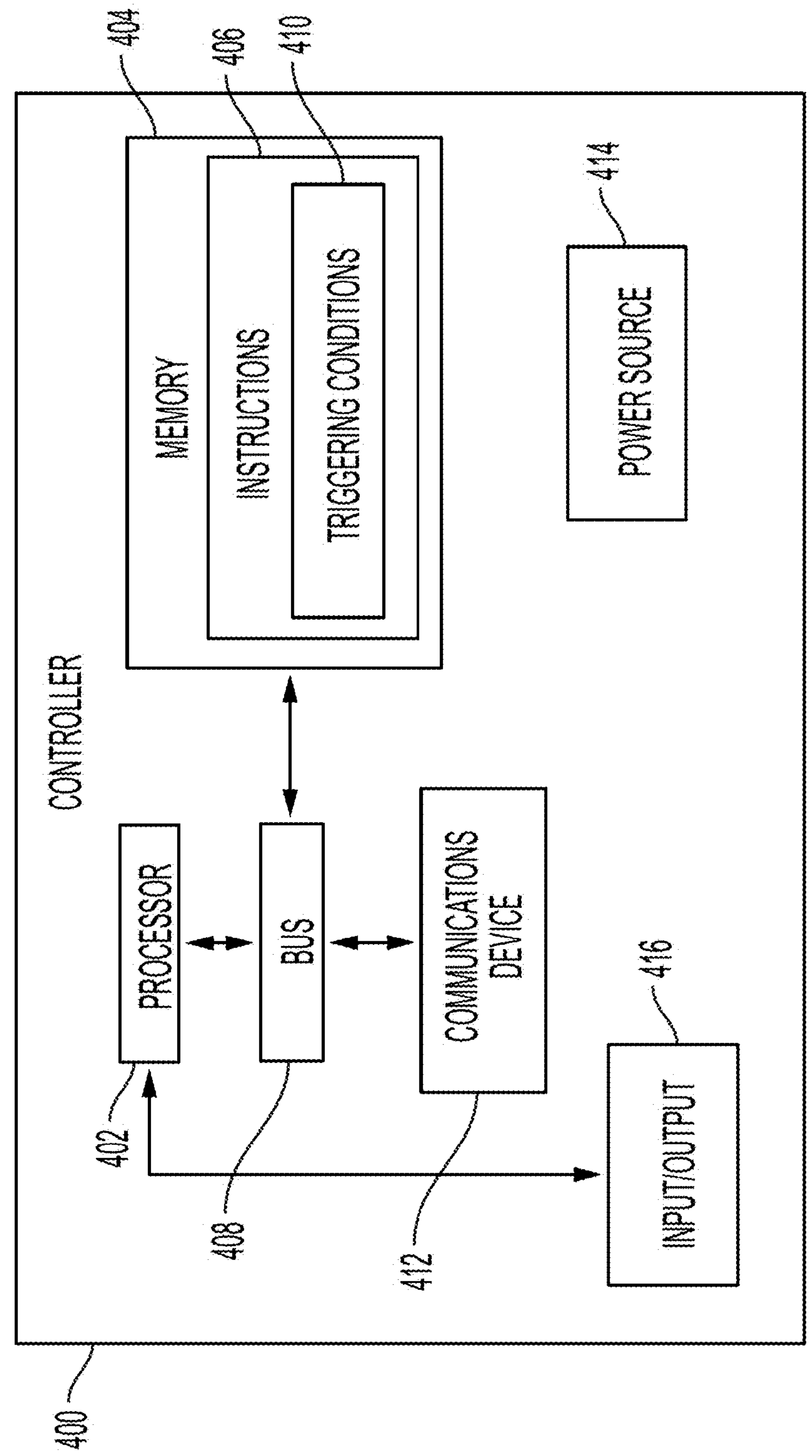
FIG. 4 is a block diagram of a computing system for monitoring and performing diagnostic procedures relative to a conduit of a hydrocarbon well operation, according to one example of the present disclosure.

FIG. 4 is a block diagram of one example of a controller 400 for governing the operations of a system for monitoring and performing diagnostic procedures relative to a conduit of a hydrocarbon well operation. The various components shown in FIG. 4, such as the processor 402, the memory 404, the communications device 412, and the power source 414, may be integrated into a single structure, such as within a single housing of a data acquisition device or a separate controller. Alternatively, at least some of the components shown in FIG. 4 can be distributed from one another and in electrical communication with each other.

As explained above, the controller 400 may be a standalone component of a system, or can be a part of a data acquisition device of a system. In either case, the controller 400 can include a processor 402, and a (e.g., non-volatile) memory 404. The memory may include instructions 406 that are executable by the processor to cause the processor to perform the various operations described herein.

The processor can communicate with the memory and with other components of the controller 400 via a bus 408. The processor 402 can execute various operations related to monitoring and performing diagnostic procedures on a conduit of a hydrocarbon well operation. For example, the processor 402 may initiate operation of a system based on the occurrence of a triggering condition, such as one of the previously described triggering conditions. Triggering conditions 410 used by the processor 402 may be stored in the memory 404 of the controller 400 in some examples.

The processor 402 can include one processing device or multiple processing devices or cores. Non-limiting examples of the processor 402 include a Field-Programmable Gate Array ("FPGA"), an application-specific integrated circuit ("ASIC"), a microprocessor, etc. The processor 402 can be communicatively coupled to the memory 404 via the bus

408. The memory 404 may include any type of memory device that retains stored information when powered off. Non-limiting examples of the memory 404 may include EEPROM, flash memory, or any other type of non-volatile memory. In some examples, at least part of the memory 404 can include a medium from which the processor 402 can read the instructions 406. A computer-readable medium can include electronic, optical, magnetic, or other storage devices capable of providing the processor 402 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The controller 400 can include a communications device 412. The processor can communicate with communications device over the bus 408. In some examples, part of the communications device 412 can be implemented in software. For example, the memory 404 can include additional instructions that control operations of the communications device 412. The communications device 412 can receive signals from system devices or components (e.g., first and second sensors, data acquisition device) and transmit data to system devices or components (e.g., computing device). For example, the communications device 412 can transmit wireless communications using an antenna. The controller 400 can also include a power source 414. In some examples, the power source 414 can include a battery or an electrical cable (e.g., a wireline).

The controller 400 can additionally include an input/output interface 416. The processor can communicate with input/output interface 416 over the bus 408. The input/output interface 416 can connect to a keyboard, pointing device, display, or other computer input/output devices. An operator may provide input to the controller using the input/output interface 416. Data relating to system operations can be presented to an operator on a display that is connected to or is part of the input/output interface 416.

Figure 5:
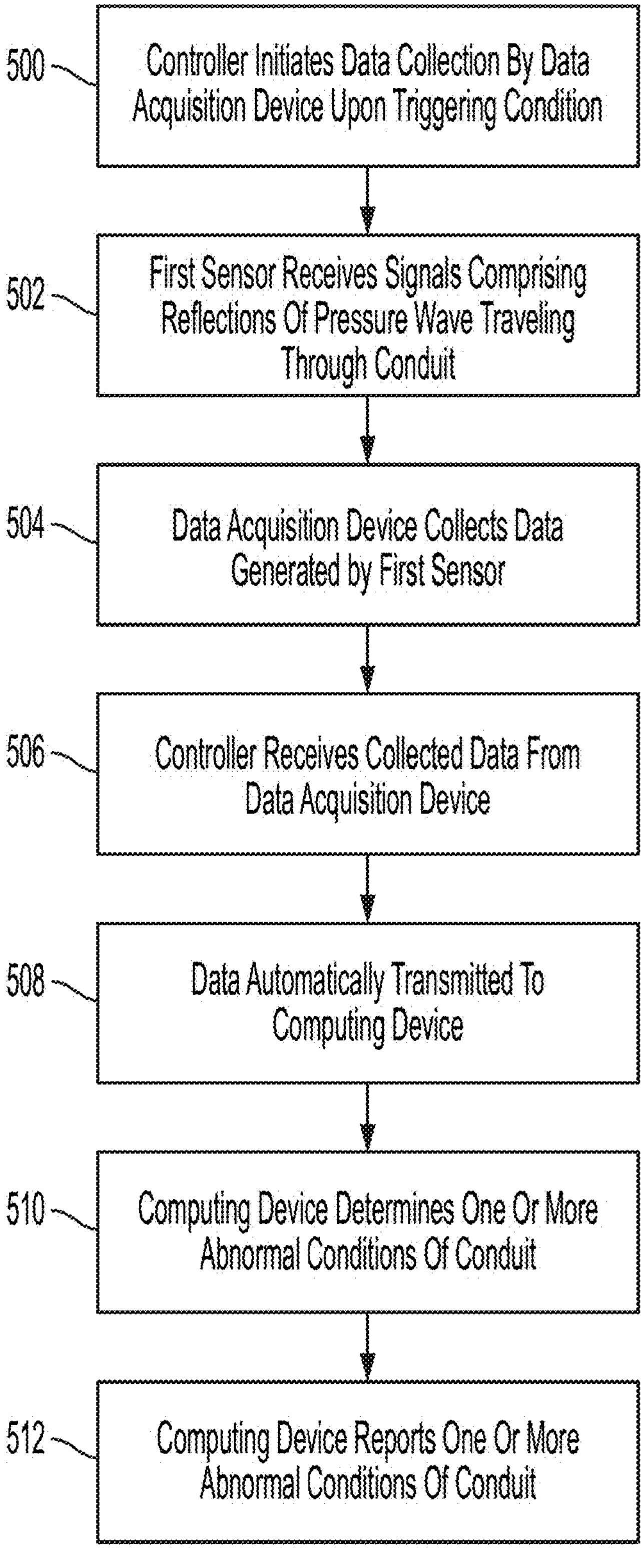
FIG. 5 is a flow chart representing a method of monitoring and performing diagnostic procedures relative to a conduit of a hydrocarbon well operation, according to one example of the present disclosure.

FIG. 5 is a flow chart of a method of monitoring and performing diagnostics on a conduit of a hydrocarbon well operation. At block 500, a controller initiates data collection by a data acquisition device upon occurrence of a triggering condition. At block 502, a first sensor installed to the hydrocarbon well, receives signals comprising reflections of a pressure wave traveling through the conduit. At block 504, the data acquisition device collects data generated by the first sensor relative to signals received by the first sensor. At block 506, the controller receives the collected data from the data acquisition device. At block 508, the data is automatically transmitted by the controller to a computing device. At block 510, the computing device determines, based on the data, one or more abnormal conditions of the conduit, and reports the one or more abnormal conditions of the conduit at block 512.

For purposes of illustration, various examples have been provided above relative to hydrocarbon well conduits, fluids, and operations. However, it should be understood that examples can also be used to monitor and perform diagnostic procedures on other types of conduits. For example, a system example can be used to monitor and perform diagnostic procedures on conduits carrying water, hydrogen, carbon dioxide, or other fluids. In one particular example, a system and method can be used to monitor and perform diagnostic procedures on a conduit of a carbon capture, utilization and storage (CCUS) operation, where carbon dioxide is captured from a source and transported to another location for use or for geologic sequestration in an underground formation.

According to aspects of the present disclosure, a system, a method, and a non-transitory computer-readable medium, are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a hydrocarbon well conduit monitoring and diagnostic system, comprising: a first sensor permanently installed to a location in fluid communication with the conduit, the first sensor positioned to receive signals comprising reflections of a pressure wave traveling through the conduit; a data acquisition device communicatively coupled to the first sensor to receive and collect pressure data generated by the first sensor in response to the signals received by the first sensor, the data acquisition device configured to collect the pressure data at a sampling rate greater than 4 kHz; a computing device; and a controller communicatively coupled to the computing device, the controller including a processor and memory communicatively coupled to the processor, the memory including instructions that are executable by the processor to cause the processor to: initiate data collection by the data acquisition device upon occurrence of a triggering condition; receive the pressure data generated by the first sensor and collected by the data acquisition device; and automatically transmit the pressure data to the computing device; wherein the computing device is programmed to determine one or more abnormal conditions of the conduit by analyzing the pressure data received from the controller within a frequency range of 0 Hz to 70 Hz.

Example 2 is the system of example 1, wherein the conduit is selected from the group consisting of a wellbore casing, a flowline, and a pipeline.

Example 3 is the system of example 1, further comprising a pulse generator for transmitting a pressure wave into the conduit, the pulse generator communicatively coupled to the controller and configured to generate a pressure wave within a timing window of 0.5 seconds to 2 seconds.

Example 4 is the system of example 1, wherein the triggering condition is selected from the group consisting of a change in pressure of a fluid flowing within the conduit, a change in a characteristic of a fluid flowing within the conduit, a scheduled operation, expiration of a timer, and a manual command.

Example 5 is the system of example 4, further comprising a second sensor associated with the conduit and communicatively coupled to the controller, the second sensor located and configured to detect the change in pressure of the fluid flowing within the conduit.

Example 6 is the system of example 1, wherein the one or more abnormal conditions of the conduit are selected from the group consisting of a deposition inside the conduit, a blockage inside the conduit, and a leak in the conduit.

Example 7 is the system of example 1, wherein the computing device is located remotely from the conduit and the controller is communicatively coupled to the computing device over a network.

Example 8 is the system of example 1, wherein the controller is a part of the data acquisition device.

Example 9 is a method comprising: installing a first sensor to a location in fluid communication with a conduit of a hydrocarbon well; communicatively coupling a data acquisition device to the first sensor; initiating, by a controller upon occurrence of a triggering condition, data collection by the data acquisition device; receiving, by the first sensor, signals comprising reflections of a pressure wave traveling through the conduit; collecting, by the data acquisition device, at a sampling rate greater than 4 kHz, pressure data generated by the first sensor in response to the signals received by the first sensor; receiving, by the controller, the pressure data collected by the data acquisition device; automatically transmitting the pressure data, by the controller to a computing device; determining, by the computing device, by analyzing the pressure data received from the controller within a frequency range of 0 Hz to 70 Hz, one or more abnormal conditions of the conduit; and reporting, by the computing device, the one or more abnormal conditions of the conduit.

Example 10 is the method of example 9, wherein the conduit is selected from the group consisting of a wellbore casing, a flowline, and a pipeline.

Example 11 is the method of example 9, wherein: a pulse generator is communicatively coupled to the controller; and in response to a command from the controller, the pulse generator transmits a pressure wave into the conduit within a timing window of 0.5 seconds to 2 seconds.

Example 12 is the method of example 9, wherein the pressure wave is generated by a leak in the conduit.

Example 13 is the method of example 9, wherein the triggering condition is selected from the group consisting of: a change in pressure of a fluid flowing within the conduit; a change in a characteristic of a fluid flowing within the conduit; a scheduled operation; expiration of a timer; and a manual command transmitted to the controller.

Example 14 is the method of example 9, wherein the one or more abnormal conditions of the conduit are selected from the group consisting of a deposition inside the conduit, a blockage inside the conduit, and a leak in the conduit.

Example 15 is the method of example 9, wherein the computing device is located remotely from the conduit and the controller transmits the pressure data to the computing device over a network.

Example 16 is a non-transitory computer-readable medium comprising instructions that are executable by a processing device for causing the processing device to perform operations comprising: initiating, by a controller upon occurrence of a triggering condition, data collection by a data acquisition device communicatively coupled to a first sensor that is installed to a location in fluid communication with a conduit of a hydrocarbon well; collecting, by the data acquisition device, at a sampling rate greater than 4 kHz, pressure data generated by the first sensor in response to signals received by the first sensor, the signals comprising reflections of a pressure wave traveling through the conduit; receiving, by the controller, the pressure data collected by the data acquisition device; and automatically transmitting the pressure data, by the controller, to a computing device, the computing device programmed to determine one or more abnormal conditions of the conduit by analyzing the pressure data received from the controller within a frequency range of 0 Hz to 70 Hz.

Example 17 is the non-transitory computer-readable medium of example 18, wherein the conduit is selected from the group consisting of a wellbore casing, a flowline, and a pipeline.

Example 18 is the non-transitory computer-readable medium of example 18, wherein the instructions are executable by the processing device for causing the processing device to send a command to a pulse generator to cause the pulse generator to transmit, within a timing window of 0.5 seconds to 2 seconds, a pressure wave into a fluid flowing in the conduit.

Example 19 is the non-transitory computer-readable medium of example 18, wherein the triggering condition is selected from the group consisting of: a change in pressure of a fluid flowing within the conduit; a change in a characteristic of a fluid flowing within the conduit; a scheduled operation; expiration of a timer; and a manual command transmitted to the controller.

Example 20 is the non-transitory computer-readable medium of example 18, wherein the computing device is located remotely from the conduit and the controller transmits the pressure data to the computing device over a network.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A hydrocarbon well conduit monitoring and diagnostic system, comprising:

a first sensor permanently installable at a first location in fluid communication with the conduit and operable to detect signals comprising reflections of a pressure wave traveling through the conduit and to generate data in response thereto;

a second sensor permanently installable at a second location in fluid communication with the conduit and operable to detect a change in pressure or a change in another characteristic of a fluid traveling through the conduit and to generate triggering signals in response thereto;

a data acquisition device communicatively coupled to the first sensor and operable to receive and collect the data generated by the first sensor, the data acquisition device operable to collect the data generated by the first sensor at a sampling rate greater than 4 kHz;

a computing device; and a controller communicatively coupled to the second sensor, the data acquisition device, and the computing device, the controller including a processor and memory communicatively coupled to the processor, the memory including instructions that are executable by the processor to cause the controller to:

cause a pressure wave generator to introduce a pressure wave into the conduit in response to receipt of a triggering signal from the second sensor, in response to causing the pressure wave to be introduced into the conduit, initiate data collection by the data acquisition device, receive, from the data acquisition device, data that is generated by the first sensor in response to detecting the reflections of the pressure wave and collected by the data acquisition device, and automatically transmit the data received from the data acquisition device to the computing device;

wherein the computing device is programmed to determine one or more abnormal conditions of the conduit by analyzing the data received from the controller within a frequency range of 0 Hz to 70 Hz.

2. The system of claim 1, wherein the conduit is selected from the group consisting of a wellbore casing, a flowline, and a pipeline.

3. The system of claim 1, wherein the pressure wave generator is configured to generate a pressure wave within a timing window of 0.5 seconds to 2 seconds.

4. The system of claim 3, wherein the pressure wave generator is an acoustic pulse emitter responsive to commands from the controller, or an electronic valve that is temporarily closable in response to a command from the controller to produce a pressure wave by interrupting a flow of pressurized fluid into the conduit.

5. The system of claim 1, wherein:

the conduit is a wellbore casing, the first location of the first sensor is an existing port of a wellhead that is fluidly coupled to the wellbore casing, and the second location of the second sensor is associated with a flowline of the wellhead;

the conduit is a flowline of a wellhead that is fluidly coupled to a wellbore, and the first location of the first sensor and the second location of the second sensor are different locations along the flowline; or the conduit is a pipeline in fluid communication with and arranged downstream of a wellbore, and the first location of the first sensor and the second location of the second sensor are different locations along the pipeline.

6. The system of claim 1, wherein the one or more abnormal conditions of the conduit are selected from the group consisting of a deposition inside the conduit, a blockage inside the conduit, and a leak in the conduit.

7. The system of claim 1, wherein the computing device is located remotely from the conduit and the controller is communicatively coupled to the computing device over a network.

8. The system of claim 1, wherein the controller is a part of the data acquisition device.

9. A method comprising:

installing a first sensor at a first location in fluid communication with a conduit of a hydrocarbon well to detect signals comprising reflections of a pressure wave traveling through the conduit and to generate data in response thereto;

installing a second sensor at a second location in fluid communication with the conduit to detect a change in pressure or a change in another characteristic of a fluid traveling through the conduit and to generate triggering signals in response thereto;

causing, by a controller communicatively coupled to the second sensor, in response to receipt of a triggering signal from the second sensor, a pressure wave generator to introduce a pressure wave into the conduit;

in response to causing the pressure wave to be introduced into the conduit, initiating, by the controller, data collection by a data acquisition device communicatively coupled to the first sensor;

detecting, by the first sensor, reflections of the pressure wave traveling through the conduit;

collecting, by the data acquisition device, at a sampling rate greater than 4 kHz, data generated by the first sensor in response to detecting the reflections of the pressure wave;

receiving, by the controller, the data collected by the data acquisition device;

automatically transmitting the data, by the controller, to a computing device;

determining, by the computing device, by analyzing the data received from the controller within a frequency range of 0 Hz to 70 Hz, one or more abnormal conditions of the conduit; and reporting, by the computing device, the one or more abnormal conditions of the conduit.

10. The method of claim 9, wherein the conduit is selected from the group consisting of a wellbore casing, a flowline, and a pipeline.

11. The method of claim 9, wherein pressure wave generator introduces the pressure wave into the conduit within a timing window of 0.5 seconds to 2 seconds.

12. The method of claim 11, wherein the pressure wave generator is an acoustic pulse emitter responsive to commands from the controller, or an electronic valve that is temporarily closable in response to a command from the controller to produce a pressure wave by interrupting a flow of pressurized fluid into the conduit.

13. The method of claim 9, wherein:

the conduit is a wellbore casing, the first location of the first sensor is an existing port of a wellhead that is fluidly coupled to the wellbore casing, and the second location of the second sensor is associated with a flowline of the wellhead;

the conduit is a flowline of a wellhead that is fluidly coupled to a wellbore, and the first location of the first sensor and the second location of the second sensor are different locations along the flowline; or the conduit is a pipeline in fluid communication with and arranged downstream of a wellbore, and the first location of the first sensor and the second location of the second sensor are different locations along the pipeline.

14. The method of claim 9, wherein the one or more abnormal conditions of the conduit are selected from the group consisting of a deposition inside the conduit, a blockage inside the conduit, and a leak in the conduit.

15. The method of claim 9, wherein the computing device is located remotely from the conduit and the controller transmits the data to the computing device over a network.

16. A non-transitory computer-readable medium comprising instructions that are executable by a processing device of a controller of a hydrocarbon well conduit monitoring and diagnostic system for causing the controller to perform operations comprising:

causing a pressure wave generator to introduce a pressure wave into the conduit in response to a triggering signal from a second sensor that is communicatively coupled to the controller and installed in fluid communication with the conduit of the hydrocarbon well to detect a change in pressure or a change in another characteristic of a fluid traveling through the conduit and to generate triggering signals in response thereto;

in response to causing the pressure wave to be introduced into the conduit, initiating data collection at a sampling rate greater than 4 kHz by a data acquisition device communicatively coupled to a first sensor that is installed at a first location in fluid communication with the conduit of the hydrocarbon well to detect signals comprising reflections of the pressure wave traveling through the conduit and to generate data in response thereto;

receiving data collected by the data acquisition device from the first sensor; and automatically transmitting the data to a computing device programmed to determine one or more abnormal conditions of the conduit by analyzing the data received from the controller within a frequency range of 0 Hz to 70 Hz.

17. The non-transitory computer-readable medium of claim 16, wherein the conduit is selected from the group consisting of a wellbore casing, a flowline, and a pipeline.

18. The non-transitory computer-readable medium of claim 16, wherein the pressure wave generator is operable to introduce the pressure wave into the conduit within a timing window of 0.5 seconds to 2 seconds.

19. The non-transitory computer-readable medium of claim 18, wherein the pressure wave generator is an acoustic pulse emitter responsive to commands from the controller, or an electronic valve that is temporarily closable in response to a command from the controller to produce a pressure wave by interrupting a flow of pressurized fluid into the conduit.

20. The non-transitory computer-readable medium of claim 16, wherein the computing device is located remotely from the conduit and the controller transmits the data to the computing device over a network.

* * * * *